(12) United States Patent
Modinger et al.

(10) Patent No.: US 10,655,651 B2
(45) Date of Patent: May 19, 2020

(54) ROTARY ACTUATOR WITH POSITION FEEDBACK DEVICE AND PROCESS VALVE MODULE

(71) Applicant: FESTO AG & Co. KG, Esslingen (DE)

(72) Inventors: Uwe Modinger, Wernau (DE); Mathias Schneider, Stuttgart (DE); Karl Messerschmidt, Esslingen (DE); Andreas Feiler, Schwabisch Gmund (DE)

(73) Assignee: FESTO SE & CO. KG, Esslingen (DE)

( * ) Notice: Subject to any disclaimer, the term of this patent is extended or adjusted under 35 U.S.C. 154(b) by 144 days.

(21) Appl. No.: 15/579,034

(22) PCT Filed: Jun. 15, 2015

(86) PCT No.: PCT/EP2015/063325
§ 371 (c)(1),
(2) Date: Dec. 1, 2017

(87) PCT Pub. No.: WO2016/202354
PCT Pub. Date: Dec. 22, 2016

(65) Prior Publication Data
US 2018/0172032 A1 Jun. 21, 2018

(51) Int. Cl.
*F15B 15/06* (2006.01)
*F16K 31/163* (2006.01)
(Continued)

(52) U.S. Cl.
CPC ............ *F15B 15/065* (2013.01); *F15B 15/14* (2013.01); *F15B 15/2807* (2013.01);
(Continued)

(58) Field of Classification Search
CPC ... F15B 15/2807; F15B 15/14; F15B 15/2861
(Continued)

(56) References Cited

U.S. PATENT DOCUMENTS 3,460,799 A * 8/1969 Sanctuary ............. F15B 15/066
251/30.05
4,087,074 A * 5/1978 Massey ................. F15B 15/065
251/58
(Continued)

FOREIGN PATENT DOCUMENTS

CN 2429707 Y 5/2001
CN 1734146 A 2/2006
(Continued)

*Primary Examiner* — Angelisa L. Hicks
(74) *Attorney, Agent, or Firm* — Hoffmann & Baron, LLP

(57) ABSTRACT

A fluid-actuated rotary actuator includes a housing having a tubular body extending in an axial direction, in which is provided a drive piston assembly for driving a rotatably mounted output shaft, which extends perpendicular to the axial direction through the tubular body and the axial end of which is routed out of the tubular body at an upper wall section of the tubular body, further including a magnet assembly associated with the axial end of the output shaft and receiving a rotary movement of the output shaft, and further including a position feedback device configured to detect the magnetic field generated by the magnet assembly and to provide, in accordance with the detected magnetic field, a position signal corresponding to a position of the output shaft, wherein the position feedback device is located in a receptacle chamber formed in the upper wall section of the tubular body.

15 Claims, 10 Drawing Sheets

(51) Int. Cl.
*F16K 37/00* (2006.01)
*F15B 15/28* (2006.01)
*F15B 15/14* (2006.01)
*F15B 19/00* (2006.01)

(52) U.S. Cl.
CPC ...... *F15B 15/2861* (2013.01); *F16K 31/1635* (2013.01); *F16K 37/0033* (2013.01); *F15B 19/002* (2013.01); *F15B 2211/85* (2013.01); *F15B 2211/8752* (2013.01)

(58) Field of Classification Search
USPC .............................. 137/551, 554, 556, 553
See application file for complete search history.

(56) References Cited

U.S. PATENT DOCUMENTS

| | | | | |
|---|---|---|---|---|
| 4,663,601 | A | * | 5/1987 | Troutman ........... F16K 37/0041 324/207.13 |
| 6,044,791 | A | * | 4/2000 | LaMarca ............. F16K 37/0058 116/277 |
| 6,135,147 | A | | 10/2000 | Peters et al. |
| 2003/0033867 | A1 | * | 2/2003 | Posey ................... F16K 5/0647 73/168 |
| 2004/0150523 | A1 | * | 8/2004 | Kelsch ................ G08B 13/149 340/568.1 |

FOREIGN PATENT DOCUMENTS

| | | |
|---|---|---|
| CN | 103842701 A | 6/2014 |
| DE | 10350305 A1 | 5/2005 |
| EP | 1325236 | 8/2005 |
| EP | 2531730 | 6/2015 |
| JP | 2003120608 | 4/2003 |

* cited by examiner

ROTARY ACTUATOR WITH POSITION FEEDBACK DEVICE AND PROCESS VALVE MODULE

This application claims priority based on and International Application filed under the Patent Cooperation Treaty, PCT/EP2015/063325, filed Jun. 15, 2015.

BACKGROUND OF THE INVENTION

The invention relates to a fluid-actuated rotary actuator comprising a housing having a tubular body extending in an axial direction, in which is provided a drive piston assembly for driving a rotatably mounted output shaft which extends perpendicular to the axial direction through the tubular body and the axial end of which is routed out of the tubular body at an upper wall section of the tubular body, further comprising a magnet assembly associated with the axial end of the output shaft and receiving a rotary movement of the output shaft, and further comprising a position feedback device designed to detect the magnetic field generated by the magnet assembly and to provide, in accordance with the detected magnetic field, a position signal corresponding to a position of the output shaft.

A rotary actuator of this type is usually mounted on a valve fitting or a process valve and is used to actuate a valve member of a valve fitting placed in a process fluid for controlling and/or blocking a fluid flow. The output shaft of the rotary actuator is mechanically coupled to a spindle of the valve fitting. The spindle is in turn mechanically coupled to the valve member of the valve fitting, so that the valve member is actuated by way of an actuation of the spindle. The valve member of the valve fitting may, for example, be designed as a flap, throttle valve, cone valve, ball valve or ball cock. By the coupling between the output shaft and the valve member, the position of the valve member is determined by the position of the output shaft.

It is desirable to detect the position of the valve member, so as to be able to better monitor the operation of the valve fitting. Due to the coupling between the valve member and the output shaft, the position of the valve member does not have to be detected directly. Instead, the position of the valve member can be detected indirectly by detecting the position of the output shaft.

Detecting the position of the output shaft of a rotary actuator by means of a position feedback device mounted on the top of the rotary actuator is known from prior art. The position feedback device known from prior art comprises, for example, micro-switches or inductive switches which are actuated via adjustable contact cams in certain positions of the output shaft and which output corresponding signals to a control or management system.

From U.S. Pat. No. 6,135,147, a rotary actuator is known which has a monitoring arrangement mounted on the top of its housing and is used for detecting the position of the output shaft. For this purpose, an indicating device provided with magnets and rotating together with the output shaft is secured to the output shaft, which projects from the housing at the top. In a monitoring arrangement located on the top of the housing adjacent to the indicating device, magnetic switches are provided to apply a current to LEDs as a function of the position of the magnets.

SUMMARY OF THE INVENTION

It is an object of the invention to provide a rotary actuator with a position feedback device of a particularly practical and compact design.

This object is solved for a fluid-actuated rotary actuator of the type described above by means of the features of claim 1.

In the fluid-actuated rotary actuator according to the invention, the position feedback device is located in or inserted into a receptacle chamber formed in the upper wall section of the tubular body.

According to the invention, the position feedback device is therefore located inside the wall of the tubular body. Compared to prior art, this offers a practical and compact design in which the position feedback device increases the installation space of the rotary actuator hardly, if at all. Moreover, the position feedback device is thereby optimally protected against mechanical damage and harmful environmental effects.

According to the invention, the position feedback device is located in the same wall section of the tubular body where the axial end of the output shaft emerges. This is advantageous, because it reduces the distance between the magnet assembly and the position feedback device, so that the magnetic field of the magnet assembly can be detected better and the magnet assembly and the position feedback device are subject to less stringent requirements.

In particular, the receptacle chamber is oblong and oriented in the direction of the axial end of the output shaft. In this manner, the position feedback device can be brought particularly close to the magnet assembly associated with the axial end of the output shaft.

The rotary actuator is preferably suitable for mounting on a valve fitting and forming a process valve unit together with the valve fitting. Such a process valve unit is often used in locations where little installation space is available owing to several pipes placed on top of or next to one another. The compact design of the rotary actuator offers the advantage that a rotary actuator with position feedback device can be used even in such locations with highly restricted space.

Preferably, the position feedback device is completely accommodated in the upper wall section of the tubular body. This offers the advantage of an extremely compact design.

Alternatively, it is possible for a connector of the position feedback device to project upwards from the upper wall section through a recess provided there. In this way, it is very easy to connect the position feedback device to an external control unit, for example.

It is noted that in the context of the rotary actuator described here the terms "top" and "bottom" (or "upper" and "lower") do not define an orientation relating to the surface of the earth or to gravitation, but instead serve to refer to certain sides of the rotary actuator or certain directions relative to the output shaft. "Top" in particular refers to the side of the rotary actuator where the axial end of the output shaft emerges, or to the axial direction of the output shaft from the housing towards the axial end of the output shaft.

The magnet assembly associated with the axial end of the output shaft receives a rotary movement of the output shaft. This means that the magnet assembly and the output shaft are non-rotatably connected to one another, so that the magnet assembly turns with the output shaft or is pivoted thereby. Accordingly, the position of the magnet assembly is determined by the position of output shaft. For this purpose, the magnet assembly can be directly secured to the output shaft, or it can be accommodated in a module such as a position indicator, which is in turn non-rotatably connected to the output shaft.

The magnet assembly is in particular designed and/or arranged such that the position feedback device detects different magnetic fields or magnetic field strengths in different positions of the output shaft. For this purpose, the magnet assembly can be provided with a magnetisation which varies spatially. As an alternative or in addition thereto, the magnet assembly can be positioned relative to the output shaft in such a way that the magnetic field generated by the magnet assembly is not circular symmetric in respect to the axial direction of the output shaft in at least one spatial direction.

The position feedback device is designed to detect the magnetic field generated by the magnet assembly. For this purpose, the position feedback device comprises, for example, a magnetic field sensor element designed to detect a magnetic field strength in one or more spatial directions.

As a function of the detected magnetic field, the position feedback device provides a position signal corresponding to a position or angular position of the output shaft. For this purpose, the position feedback device preferably comprises evaluation electronics for converting the detected magnetic field or the magnetic field strength(s) detected by the magnetic field sensor element into a position signal representing the angular position of the output shaft. This integration of the evaluation electronics into the wall of the tubular body is particularly advantageous, because there is no need for an external evaluation unit located on the outside of the tubular body, which would increase the installation space required for the rotary actuator.

The position feedback device can be designed to detect one or two angular positions of the output shaft, such as its two end positions, and to indicate them in the position signal. In this context, end positions are in particular positions of the output shaft in which a valve member of a valve fitting actuated by the rotary actuator is completely open or blocked. The end positions of the output shaft may, however, also be other positions of the valve member, e.g. a first and a second position. The position feedback device can furthermore be designed to detect any angular positions of the output shaft between the end positions and to indicate them in the position signal.

The tubular body preferably comprises a piston space in which the drive piston assembly is accommodated. The drive piston assembly expediently comprises a first and a second drive piston which divide the piston space into at least two chambers. Different pressures can expediently be applied to the two chambers to effect a linear movement of the drive piston and thus a rotary movement of the output shaft.

Advantageous embodiments of the invention are the subject matter of the dependent claims.

In one variant of the invention, the receptacle chamber is open towards an end face and/or a longitudinal side of the tubular body.

This means that the receptacle chamber opens out at the end face and/or at a longitudinal side of the tubular body. Such an opening to the receptacle chamber in an end face and/or a longitudinal side of the tubular body in particular offers the advantage that the position feedback device can easily be inserted into the receptacle chamber or replaced, which simplifies the production and/or maintenance of the rotary actuator.

The receptacle chamber can preferably be oriented parallel or perpendicular to the axial direction of the tubular body, and the position feedback device can be installed accordingly. The sensor can expediently be installed perpendicular to the axial direction of the tubular body. The position feedback device can in particular be installed directly into the housing without closing the installation space of the position feedback device or covering the position feedback device towards the outside.

In a further embodiment of the invention, a housing cover having a recess through which a connector and/or a cable is/are routed to the position feedback device is placed on the end face.

The recess of the housing cover is in particular in alignment with an opening to the receptacle chamber provided in the end face of the tubular body, so that a connector cable can be routed from the outside directly to the position feedback device in the receptacle chamber. Alternatively, it is possible for a connector of the position feedback device to project in the axial direction of the tubular body from the opening to the receptacle chamber and from the recess of the housing cover.

The connector or the connector cable can be connected to a control unit which receives the position signal provided by the position feedback device and preferably supplies the position feedback device with current or energy.

In a further embodiment of the invention, a housing cover which covers the receptacle chamber towards the end face and preferably holds the position feedback device in the receptacle chamber is placed on the end face.

As an alternative to the variant described above, in which the housing cover provides clearance to the opening in the end face to the receptacle chamber by way of a recess, the housing cover here covers the receptacle chamber and/or the opening to the receptacle chamber. The position feedback device can thereby preferably be held in the receptacle chamber, so that there is no need for further fastening means for the position feedback device. Alternatively, the position feedback device can be secured in the receptacle chamber by at least one fastening means. The position feedback device can in particular be installed into and/or held in the receptacle chamber without the housing cover. For this purpose, the sensor can be installed as a clamping piece. The sensor can preferably be held in the receptacle chamber by means of screws or clips.

In a further development of the invention, the position feedback device comprises an oblong shaft section, which preferably comprises a magnetic field sensor element, and a head section, the cross-section of the head section being wider and/or higher than the cross-section of the shaft section.

Accordingly, the position feedback device has at least two differently designed sections—i.e. at least one wide and/or high head section and an oblong shaft section. Between the head section and the shaft section, further sections can be provided. The evaluation electronics and/or the connector is/are preferably provided in or on the head section, while the magnetic field sensor element is provided in the shaft section. Due to the oblong design of the shaft section, the magnetic field sensor element can be brought particularly close to the magnet assembly located at the axial end of the output shaft. The head section, which is wider and/or higher than the shaft section, has room for the evaluation electronics and/or a connector.

Alternatively, the position feedback device can be designed without different sections or without a "step" in the longitudinal cross-section. The position feedback device can in particular be designed with a constant cross-section along its longitudinal axis, e.g. in the form of a cylinder with arbitrary base.

In a further embodiment of the invention, the receptacle chamber has a first section, which is open towards the end face of the tubular body and accommodates the head section, and a second section, which opens out at a rear wall of the first section and accommodates the shaft section.

The second section of the receptacle chamber in particular extends towards the axial end of the output shaft. The second section of the receptacle chamber or the shaft section of the position feedback device preferably extends as far as below the magnet assembly.

In a further embodiment of the invention, it is provided that the cross-section of the head section is wider and/or higher than the cross-section of the second section, so that the head section abuts the rear wall of the first section.

The head section can in particular be clamped between the rear wall of the first section and the housing cover in order to fix the position feedback device in the receptacle chamber. As the head section abuts the rear wall of the first section, the shaft section fitted with a sensitive magnetic field sensor element can further be mechanically relieved and/or protected.

In a further embodiment of the invention, the rotary actuator comprises a position indicator which is fitted to the axial end of the output shaft and in which the magnet assembly is located.

The position indicator can in particular be cylindrical or disc-shaped and arranged coaxially with the output shaft. The position indicator has the form of a puck in particular. The magnet assembly is preferably located in a bottom section of the position indicator and therefore close to the receptacle chamber in the wall section of the tubular body. The receptacle chamber and the position indicator are in particular arranged and/or designed such that the receptacle chamber extends below the position indicator.

In a further embodiment of the invention, the position indicator has an indicating element, preferably a marking, for the visual indication of a position of the output shaft.

The indicating element or marking is preferably not circular symmetric in respect to the axial direction of the output shaft, so that the current angular position of the output shaft can be derived from the orientation of the indicating element or marking.

The position indicator has therefore two functions. On the one hand, it enables a user to detect the current angular position of the output shaft with the aid of the indicating element and thus an angular position of a valve member of a valve fitting actuated by the output shaft. On the other hand, the position indicator accommodates the magnet assembly and turns or pivots it relative to the position feedback device in accordance with a rotary movement of the output shaft, so that the rotary movement or a resulting change in the angular position of the output shaft results in a changed magnetic field at the position feedback device, which can be detected.

In a further development of the invention, it is provided that the position indicator is removably mounted on the output shaft and the rotary actuator is designed to adopt a predetermined operating state, preferably at least one calibration state, a venting state, an emergency shut-down state and/or a maintenance state, if the position feedback device detects a removal and/or replacement of the position indicator.

The position indicator therefore advantageously acts as a user input element via which a user, by removing or replacing the position indicator at the axial end of the output shaft, can cause the rotary actuator to adopt a predetermined operating state. As the position feedback device is provided in the tubular body wall according to the invention and not, as in prior art, mounted on the housing adjacent to or above the position indicator, the position indicator is exposed and easily accessible for the user and can easily be put on the axial end of the output shaft. Alternatively, in this embodiment, the position indicator may also be provided at a location which is different from the tubular body wall.

The removal or replacement of the position indicator at the output shaft is in particular detected or determined via the magnetic field detected by the position feedback device.

The calibration state is preferably a state in which a magnetic field measurement value detected by the position feedback device is stored in allocation to at least one predetermined position, preferably an end position. The venting state is preferably a state in which one of the chambers of the rotary actuator is vented. The maintenance state is preferably a state in which a control valve assembly assigned to the rotary actuator is blocked, so that the output shaft cannot be driven by the drive piston assembly. The emergency shut-down state is preferably a state in which the output shaft is moved to a predetermined position and/or in which a torque applied by the drive piston assembly to the output shaft is reduced.

In a further embodiment of the invention, the magnet assembly comprises a permanent magnet which is preferably designed to be annular, in particular as an annular segment.

The permanent magnet, which is annular or designed as an annular segment, is preferably concentric with the output shaft, so that the distance between the permanent magnet and the position feedback device remains constant while the output shaft is turned between the two end positions. The permanent magnet can in particular have a magnetisation which varies along its circumference.

In a further embodiment of the invention, the magnet assembly comprises one or more magnet bars which is/are preferably not arranged to be coaxial with the output shaft.

In a further embodiment of the invention, the position feedback device comprises a Hall sensor, preferably a 3D Hall sensor.

The Hall sensor or 3D Hall sensor preferably forms the magnetic field sensor element mentioned above and is located on the shaft section of the position feedback device.

In a further embodiment of the invention, the receptacle chamber is open towards an end face at an axial end of the tubular body, a functional module assembly is placed on the end face, and a receptacle chamber into which the position feedback device projects is formed in the functional module assembly, preferably in an upper wall section thereof.

As the position feedback device extends into the functional module assembly, the position feedback device does not have to be so compact and/or a larger/longer position feedback device can be used.

The functional module assembly preferably comprises an electronics assembly for the monitoring and the open- and/or closed-loop control of the rotary actuator and/or a control valve assembly for the actuation of the rotary actuator. The position feedback device is in particular connected to the electronics assembly and provides it with the position signal.

The tubular body preferably has a piston space in which the drive piston assembly is located and which opens out at the end face of the tubular body where the opening to the receptacle chamber is located. The functional module assembly in particular seals the piston space in a pressure-tight manner and thus acts as a housing cover.

The functional module assembly preferably has the same cross-section as the tubular body at its axial end, so that dimensions are mainly increased in the axial direction when the functional module assembly is fitted to the end face of the tubular body. The functional module assembly is in particular likewise designed as a tubular body. In a state in which the rotary actuator is mounted on a valve fitting, the axial direction and a piping direction of the valve fitting are preferably oriented parallel to one another.

The invention further provides a process valve unit comprising the fluid-actuated rotary actuator described above and a valve fitting with a spindle and a valve member, wherein the fluid-actuated rotary actuator is mounted on the valve fitting and the valve member is mechanically coupled to the output shaft of the fluid-actuated rotary actuator via the spindle, so that the position of the valve member is determined by the position of the output shaft.

As the position of the valve member is determined by the position of the output shaft, the position of the valve member can be derived from the position signal corresponding to the position of the output shaft.

BRIEF DESCRIPTION OF DRAWINGS

Exemplary embodiments of the invention are shown in the drawing, of which.

DETAILED DESCRIPTION OF THE PREFERRED EMBODIMENTS

In the following description of the figures, identical designations are used for functionally identical components of the illustrated embodiments, and a repeated description of functionally identical components is omitted.

Figure 1:
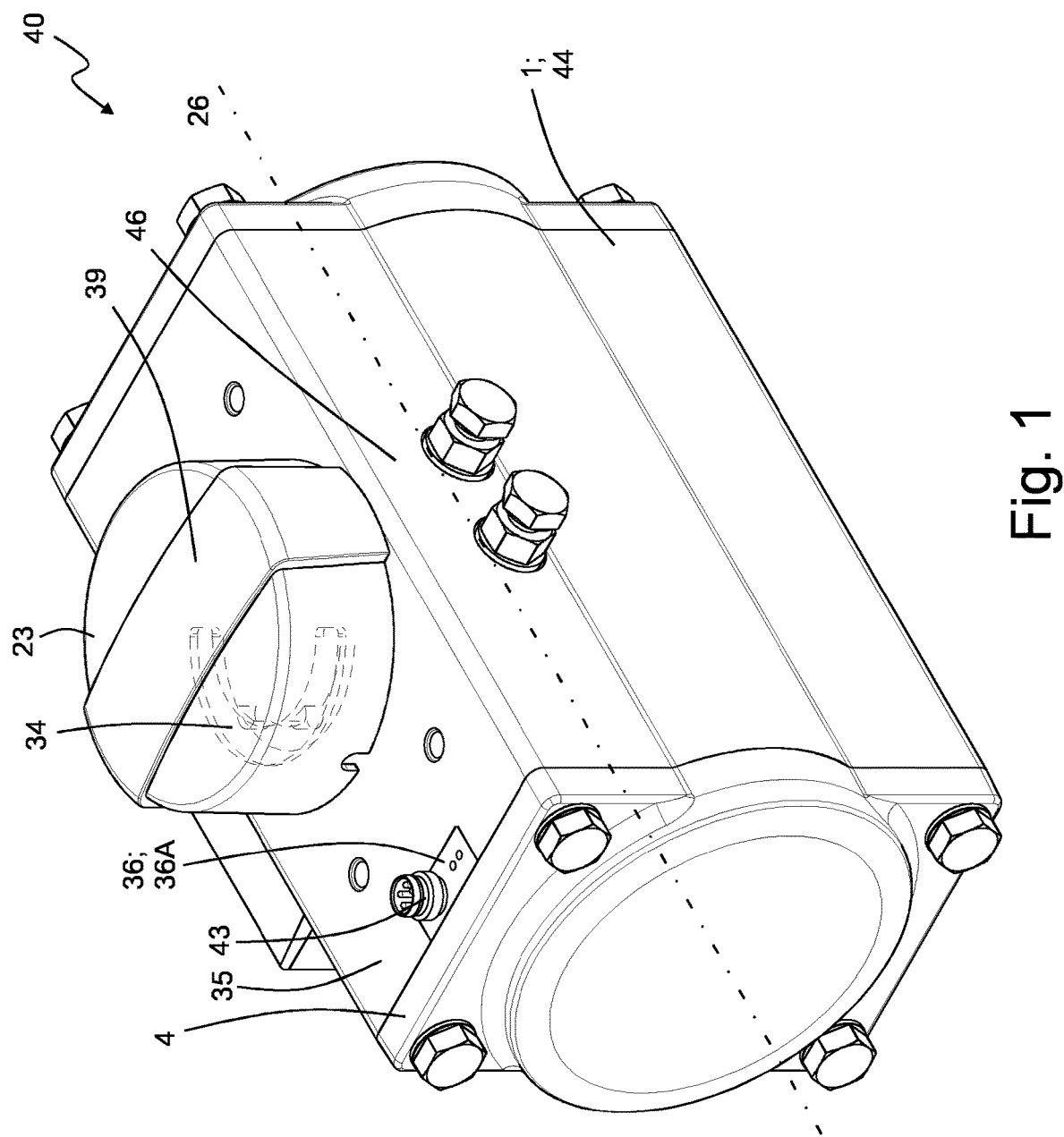
FIG. 1 is a perspective view of a rotary actuator according to a first embodiment.
Figure 2:
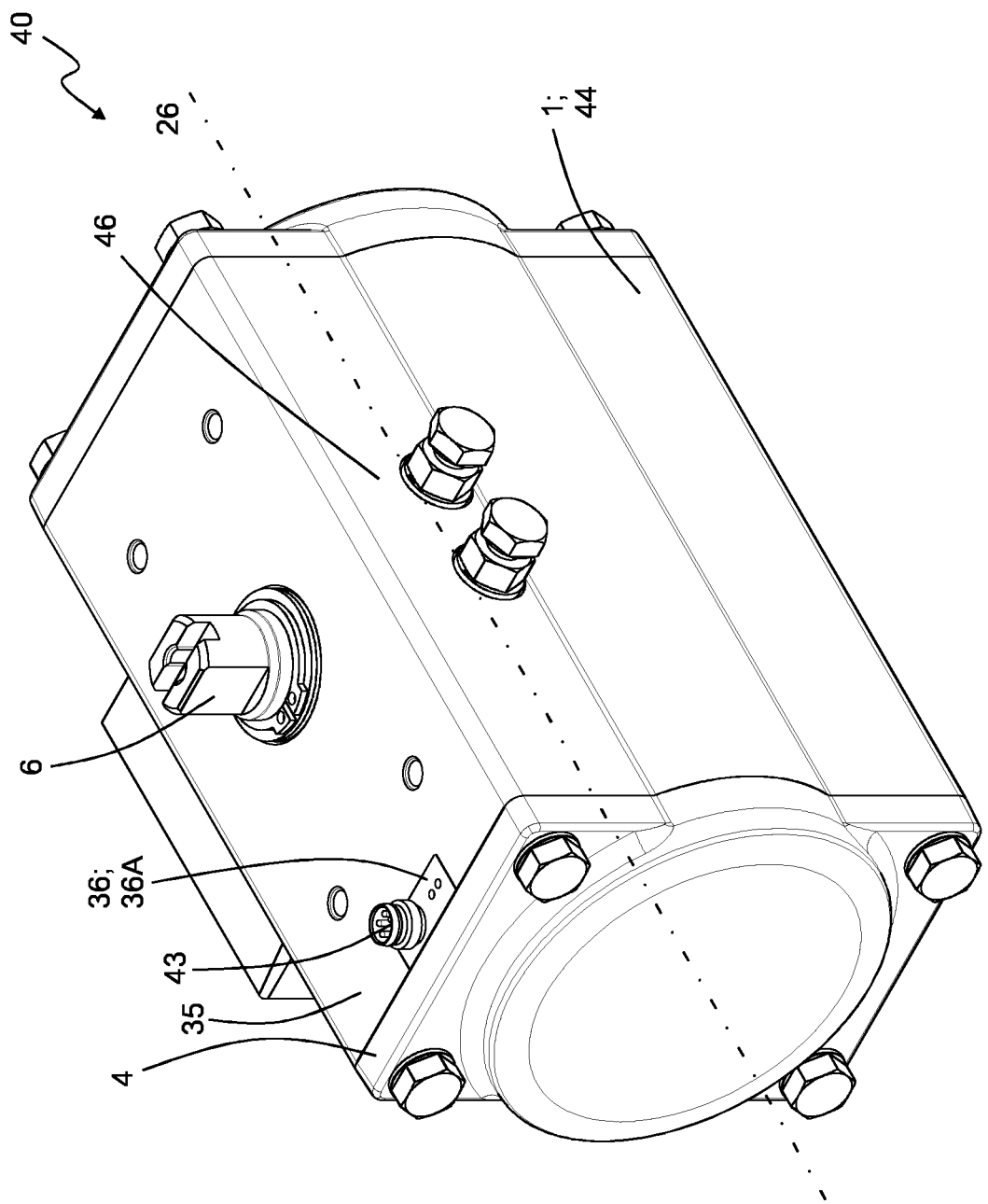
FIG. 2 is a perspective view of the rotary actuator according to the first embodiment.

FIGS. 1 to 5 are perspective views of a rotary actuator 40 according to a first embodiment. FIG. 1 shows the rotary actuator 40 with a position indicator 23 mounted at an axial end of an output shaft 6, while FIG. 2 shows the rotary actuator 40 without the position indicator 23.

The rotary actuator 40 of the first embodiment is suitable for mounting on a valve fitting 24 for the actuation of a valve member of the valve fitting 24, thereby controlling a fluid flow.

The rotary actuator 40 of the first embodiment is fluid-actuated and comprises a housing 1 with a tubular body 44 extending in an axial direction 26. In the tubular body 44 there is provided a drive piston assembly 19 for driving a rotatably mounted output shaft 6, which extends through the tubular body 44 perpendicular to the axial direction 26 and the axial end of which emerges from the tubular body 44 in an upper wall section 35 of the tubular body 44.

The fluid-actuated rotary actuator further comprises a magnet assembly 34 located at its axial end and receiving a rotary movement of the output shaft 6. In the illustrated embodiment, the magnet assembly 34 is mounted in a position indicator 23, which is likewise mounted to the axial end of the output shaft 6. The magnet assembly 34 is therefore non-rotatably connected to the output shaft 6 by means of the position indicator 23.

The fluid-actuated rotary actuator 40 further comprises a position feedback device 36, which is designed to detect the magnetic field generated by the magnet assembly 34 and to provide, in accordance of the detected magnetic field, a position signal corresponding to a position of the output shaft 6. In the illustrated embodiment, the position feedback device 36 has a connector 43, via which the position signal can preferably be output.

The position feedback device 36 is located in or inserted into a receptacle chamber 38 formed in the upper wall section 35 of the tubular body 44. The receptacle chamber 38 can be seen in the exploded view of the rotary actuator 40 shown in FIG. 5, for example.

The location of the position feedback device 36 in the receptacle chamber 38 in the wall section 35 results in a very compact design of the rotary actuator 40. Preferably, the installation space of the rotary actuator 40 is hardly, if at all, increased by the position feedback device 36.

Figure 5:
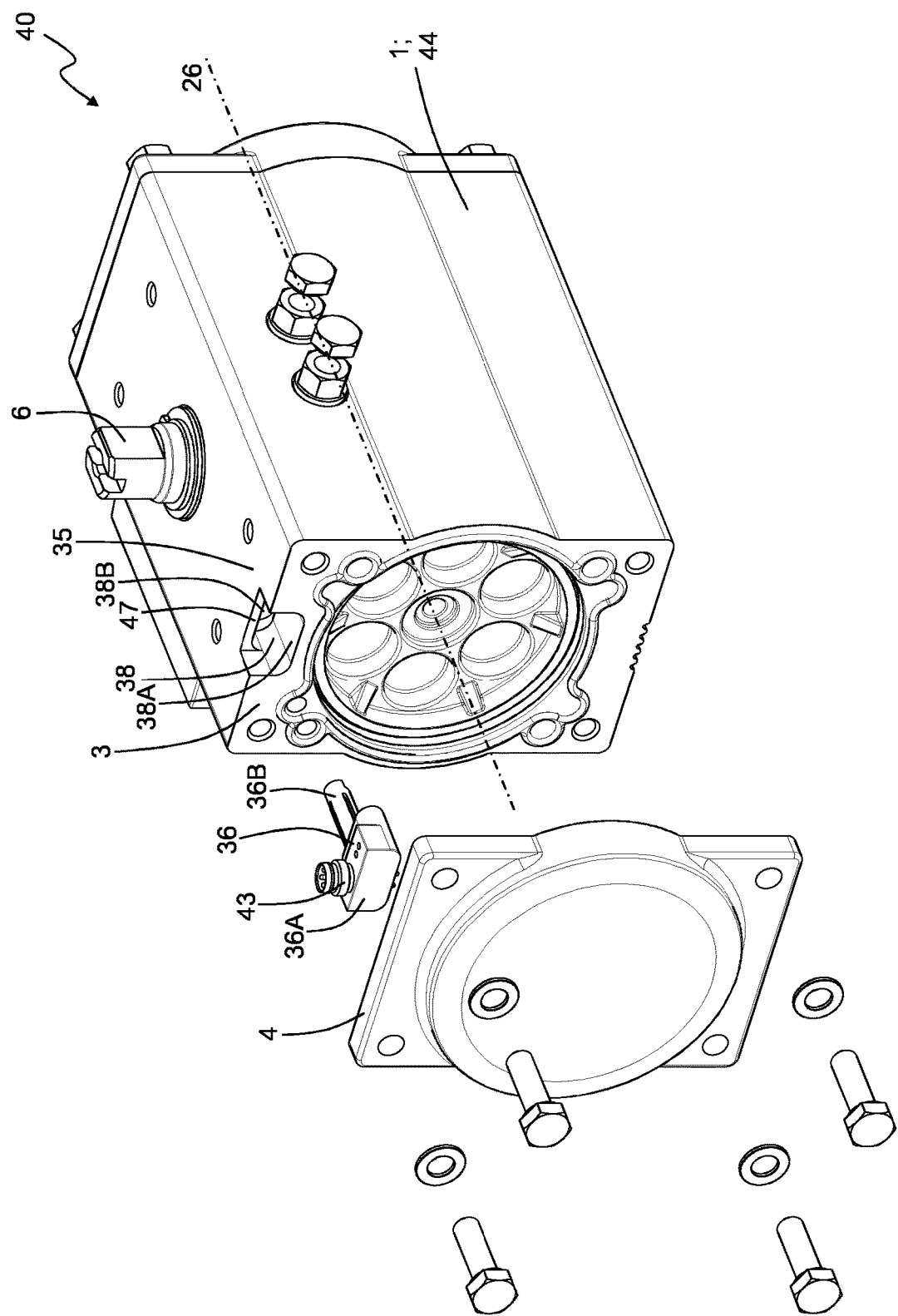
FIG. 5 is an exploded view of a tubular body of the rotary actuator according to the first embodiment.

As FIG. 5 shows by way of example, the receptacle chamber 38 is open towards the end face 3 of the tubular body 44. As a result, the position feedback device 36 can be inserted into the receptacle chamber 38 in a particularly simple way. As an alternative to the illustrated configuration, the receptacle chamber 38 can be open towards a side wall 46 of the tubular body 44.

Figure 3:
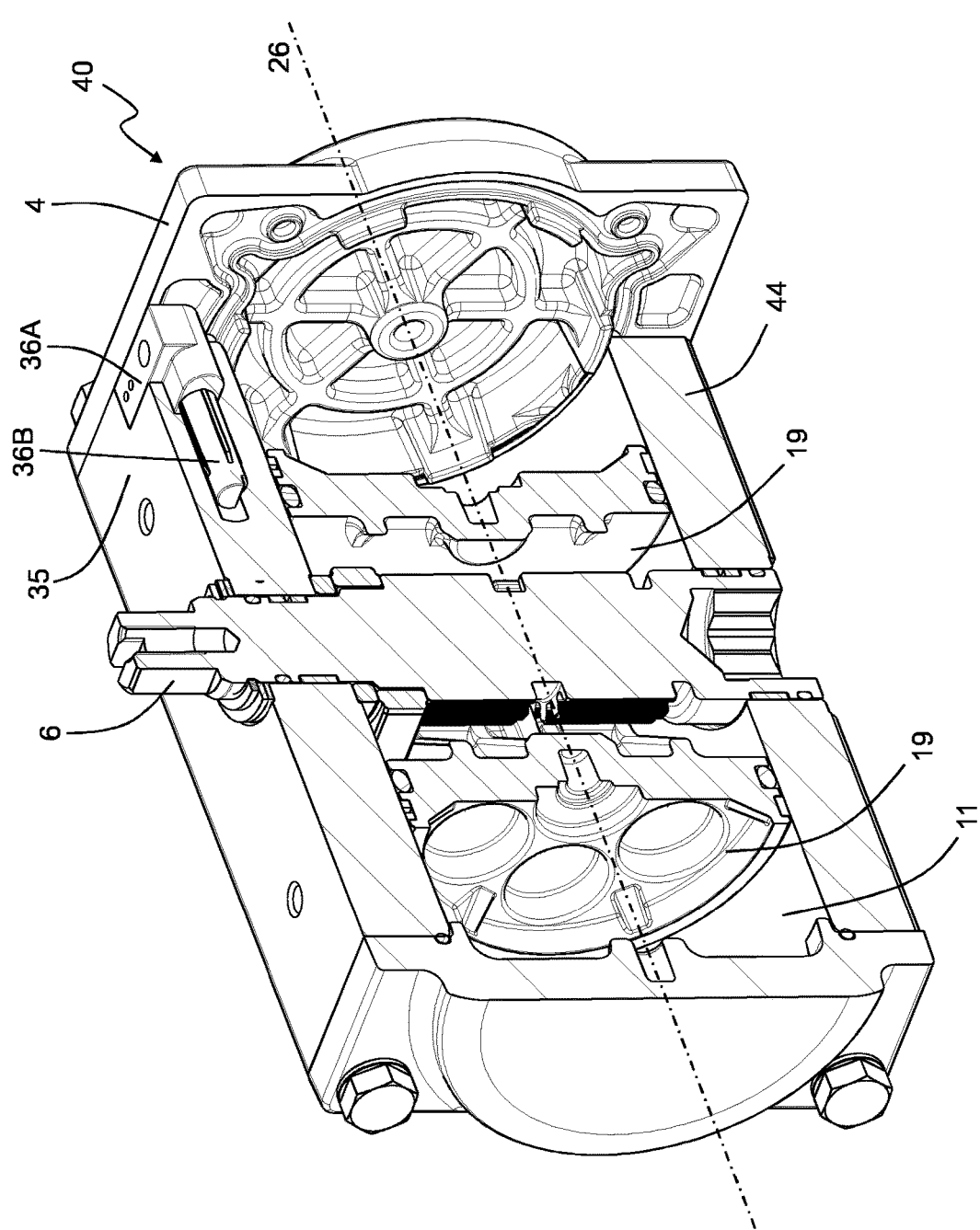
FIG. 3 is a perspective sectional view of the rotary actuator according to the first embodiment.

As FIGS. 3 and 5 show, the receptacle chamber 38 is oblong in design and oriented towards the axial end of the output shaft 6. In the illustrated embodiment, in which the receptacle chamber 38 is open towards the end face 3, the receptacle chamber 38 extends in the axial direction 26 of the tubular body.

Figure 4:
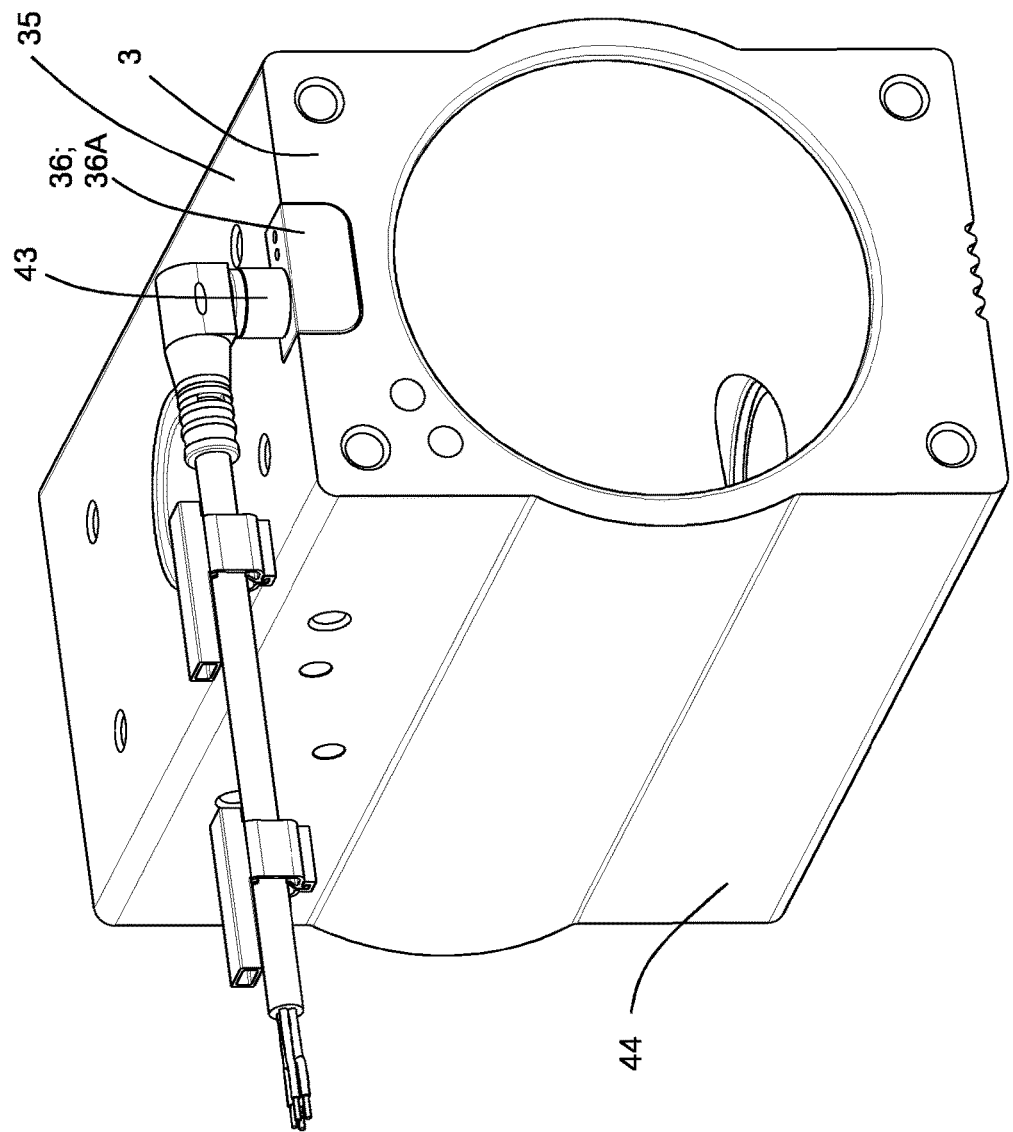
FIG. 4 is a perspective view of a tubular body of the rotary actuator according to the first embodiment.

In the embodiment shown in FIG. 5, the receptacle chamber opens out around the corner both at the upper wall section 35 and at the end face 3. This makes the installation of the position feedback device 36 particularly simple, and the connector 43 can emerge from the receptacle chamber 38 in an upward direction, i.e. in a direction parallel to the output shaft. FIG. 4 shows this design of the receptacle chamber 38 from another perspective.

A housing cover 4, which covers the receptacle chamber 38 towards the end face 3 and thus holds the position feedback device 36 in the receptacle chamber 38, is fitted to the end face 3. As an alternative or in addition thereto, the position feedback device 36 can be secured in the receptacle chamber 38 or on the tubular body 44 by its own fastening means.

As can be seen in FIG. 3, the position feedback device 36 has an oblong shaft section 36B and a head section 36A. The cross-section of the head section 36A is wider and higher than the cross-section of the shaft section 36B. A magnetic field sensor element for measuring a magnetic field strength of the magnetic field generated by the magnet assembly 34 is preferably arranged at the shaft section 36B. The head section 36A preferably comprises evaluation electronics for processing a magnetic field measurement value detected by the magnetic field sensor element and for providing or outputting a position signal based on the magnetic field measurement value.

In correspondence to the sections of the position feedback device 36, the receptacle chamber 38 has an oblong second section 38B and a first section 38A which is wider and higher than the second section 38B. The first section 38A is oriented towards the end face 3 of the tubular body 44 and the second section 38B is located between the first section 38A and the axial end of the output shaft 6 and extends towards the axial end of the output shaft 6. The first section 38A accommodates the head section 36A and the second section 38B accommodated the shaft section 36B.

As FIG. 5 further shows, the second section 38B opens out at a rear wall 47 of the first section 38A. The remaining section of the rear wall 47 forms a contact surface for the head section 36A. The head section 36A can therefore be clamped between the housing cover 4 and the rear wall 47.

As FIG. 1 shows, a cylindrical or disc-shaped position indicator 23 is placed on the axial end of the output shaft 6. The magnet assembly 34 designed as an annular segment is located in the position indicator 23 concentric with the axial direction of the output shaft 6. The magnet assembly 34 is located at a bottom section of the position indicator 23 and thus close to the upper wall section 35 and to the position feedback device 36 located therein.

The position indicator 23 further comprises a bracket-shaped indicating element 39, which extends transversely across the surface of the position indicator 23. As the position indicator 23 is non-rotatably connected to the output shaft 6, the position of the output shaft 6 can be indicated visually by means of the indicating element 39.

The position indicator 23 is preferably removable from the output shaft 6. A removal or replacement of the position indicator 23 at the output shaft 6 can be detected by means of the position feedback device 36 and interpreted as a user input by this or by another control unit associated with the rotary actuator. The rotary actuator 40 is in particular designed to adopt, if it detects that the position indicator 23 is fitted to the output shaft 6, a calibration state in which the magnetic field measurement values corresponding to the end positions of the output shaft are determined and stored.

FIG. 3 shows the drive piston assembly 19 located in a piston space 11 and consisting of two drive pistons. Each of the two drive pistons comprises a toothed rack not shown in the drawing, which is oriented in the axial direction and meshes with an output pinion mounted on the output shaft 6 for converting a linear movement of the drive pistons into a rotary movement of the output shaft 6. The toothed racks are in particular located on opposite sides of the output shaft 6, so that opposing linear movements of the drive pistons are converted into corresponding rotary movements of the output shaft 6. In this manner, the output shaft 6 turns in a first direction of rotation if the drive pistons approach one another and in a second direction of rotation if the drive pistons move away from one another. As an alternative to the toothed rack and output pinion arrangement, a tumbler yoke (Scotch yoke) can be used to convert the linear movement of the drive piston assembly 19 into a rotary movement of the output shaft 6.

Figure 6:
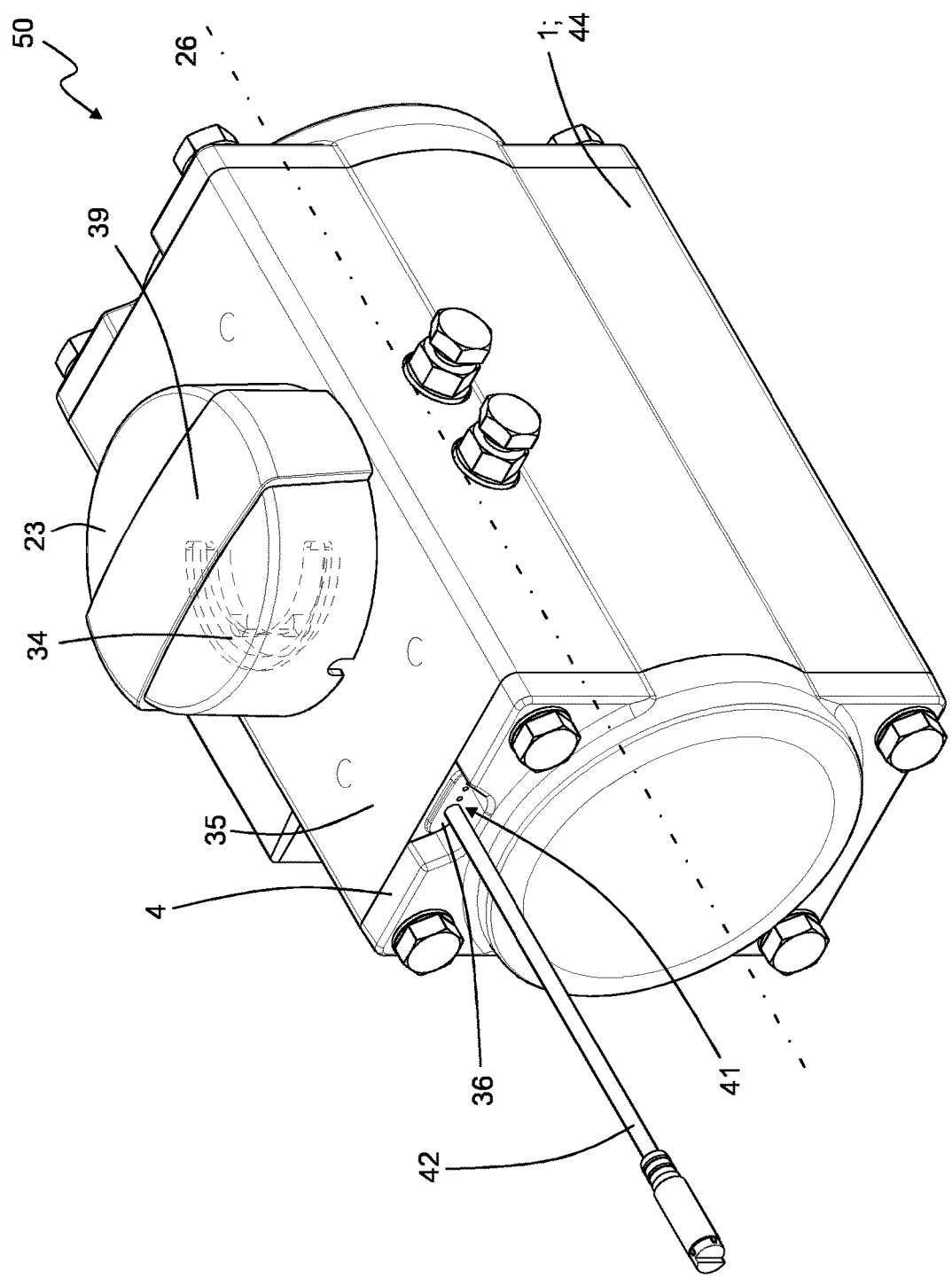
FIG. 6 is a perspective view of the rotary actuator according to a second embodiment.
Figure 7:
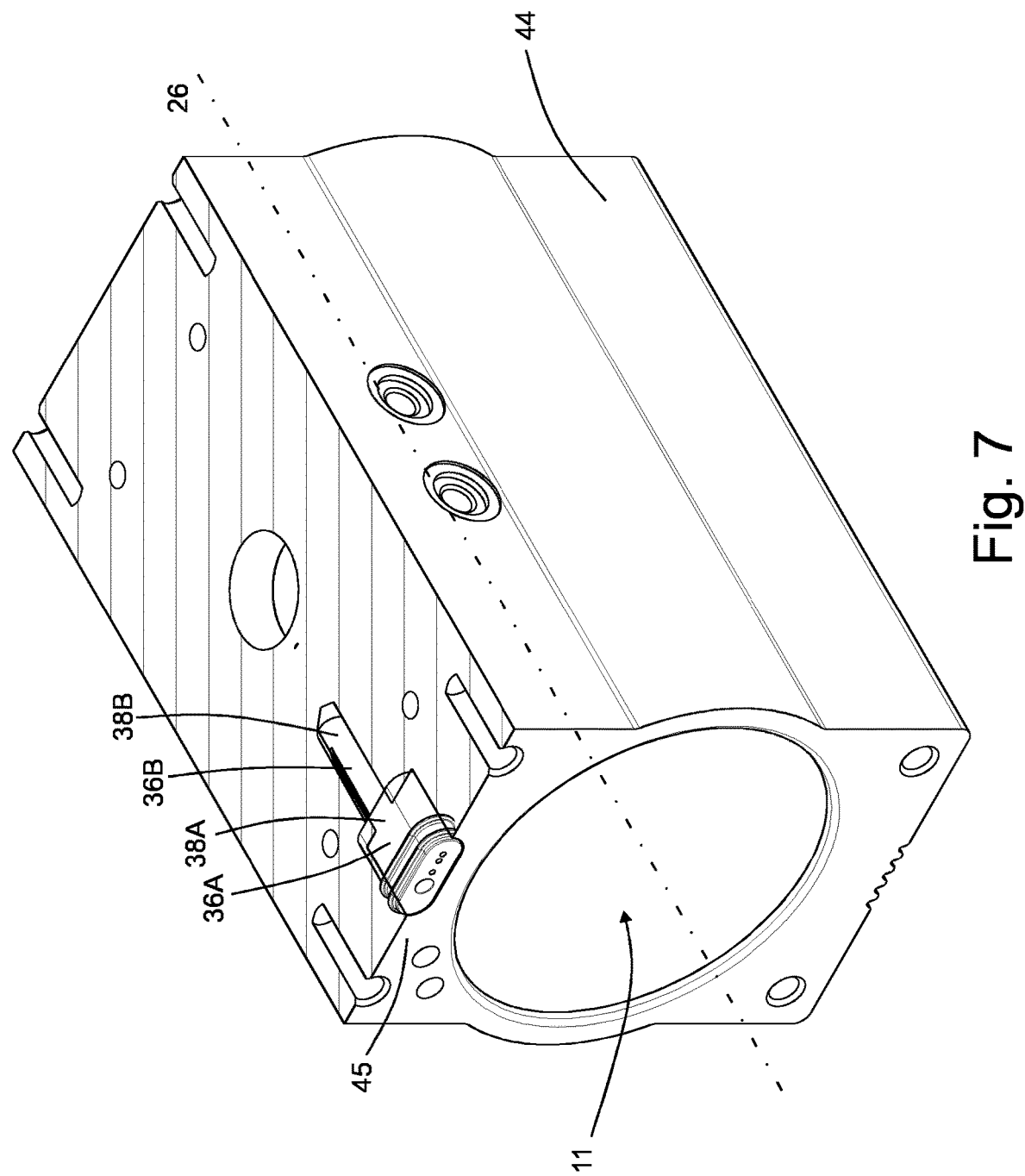
FIG. 7 is a perspective sectional view of a tubular body of the rotary actuator according to the second embodiment.

FIGS. 6 and 7 show a fluid-actuated rotary actuator 50 according to a second embodiment of the invention. The second embodiment substantially corresponds to the first embodiment, but in particular differs therefrom insofar as in the second embodiment the connector or a connecting cable 42 of the position feedback device 36 emerges from the receptacle chamber 38 through an opening in the end face 3.

For this purpose, the housing cover is provided with a recess 41, which exposes the opening in the end face 3 towards the receptacle chamber 38.

Figure 9:
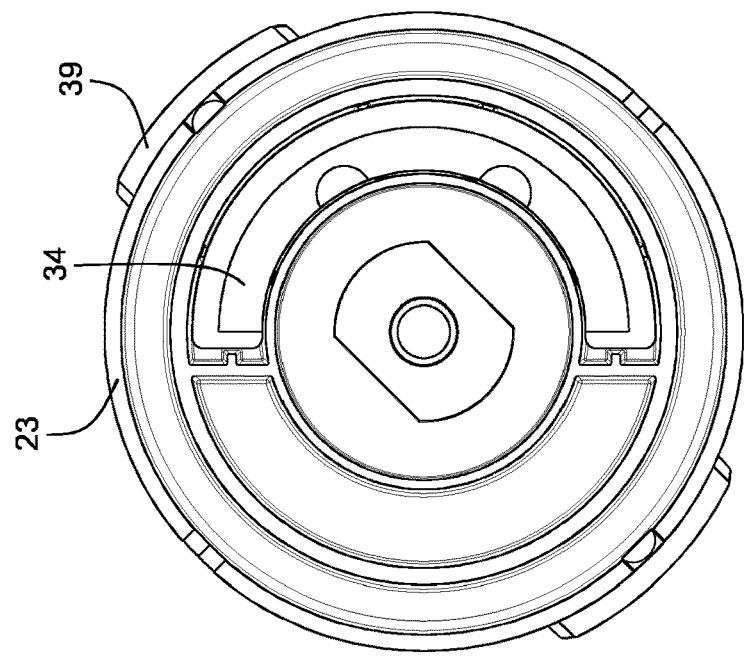
FIG. 9 is a bottom view of a position indicator of a rotary actuator according to the first and second embodiments.
Figure 8:
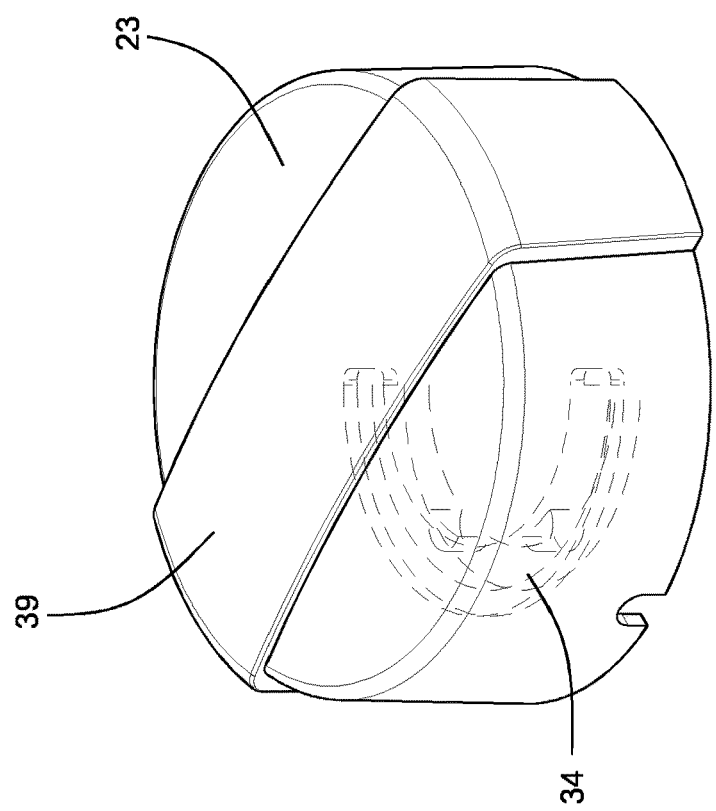
FIG. 8 is a perspective sectional view of a position indicator of a rotary actuator according to the first and second embodiments.

FIGS. 8 and 9 show the position indicator 23. As described above, the position indicator 23 comprises a bracket-shaped indicating element 39 and the magnet assembly 34 designed as an annular segment. The magnetisation of the magnet assembly 34 preferably varies along the circumference of the annular segment.

Figure 10:
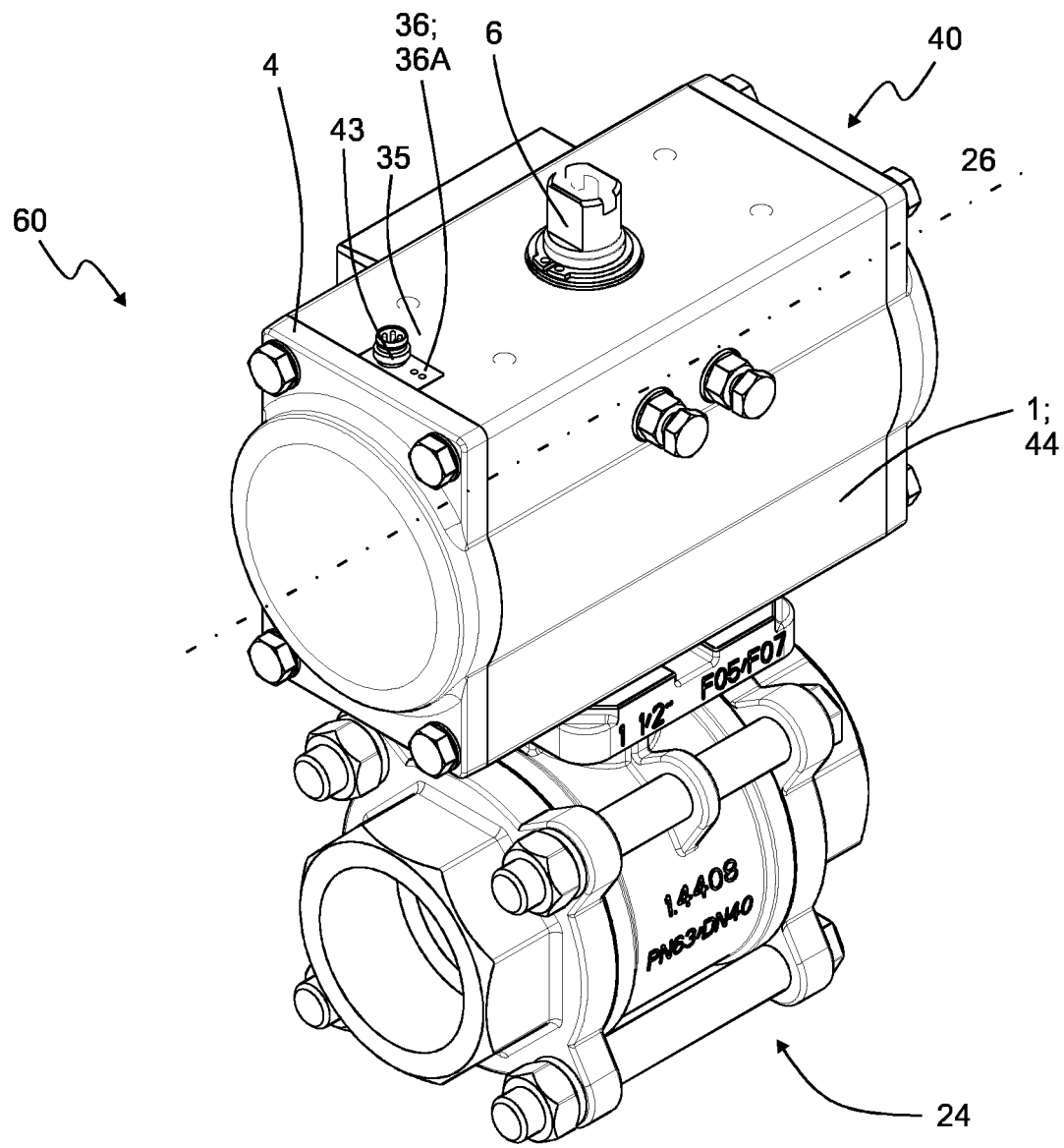
FIG. 10 is a perspective view of a process valve unit according to a third embodiment.

FIG. 10 shows a process valve unit 60 according to a third embodiment. In the illustrated embodiment, the process valve unit 60 comprises a rotary actuator 40 according to the first embodiment. Alternatively, the process valve unit 60 can comprise a rotary actuator 50 according to the second embodiment.

The rotary actuator 40 sits on a valve fitting 24 comprising a spindle and a valve member. The output shaft 6 is non-rotatably connected to the valve member of the valve fitting 24 via the spindle. The angular position of the valve member is accordingly determined by the angular position of the output shaft 6. In this manner, it is possible to derive the position of the valve member from the position signal provided by the position feedback device 36, which corresponds to the position of the output shaft 6.

Figure 11:
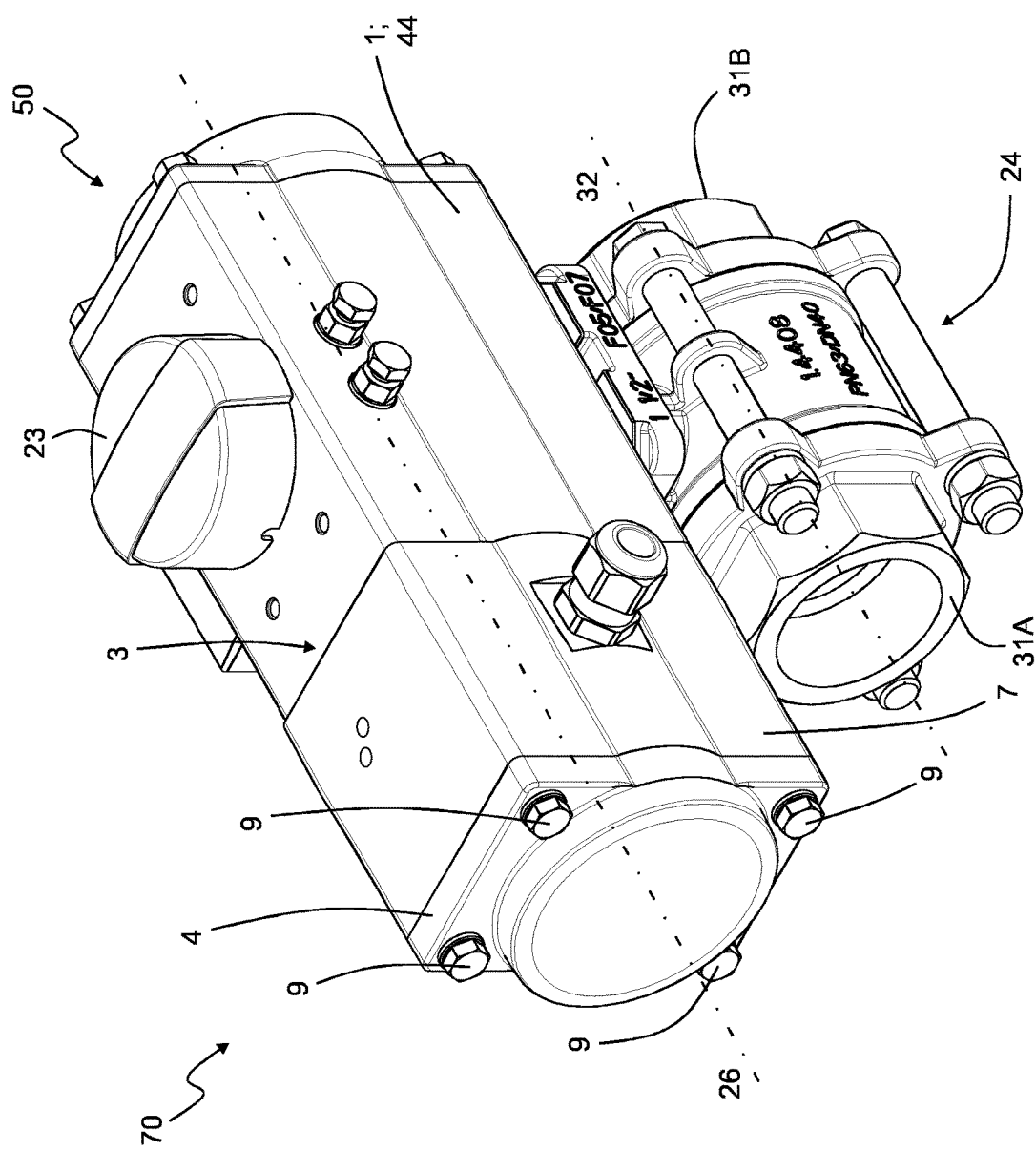
FIG. 11 is a perspective view of a process valve unit according to a fourth embodiment.

FIG. 11 shows a process valve unit 70 according to a fourth embodiment. In the illustrated embodiment, the process valve unit 70 comprises a rotary actuator 50 according to the second embodiment. Alternatively, the process valve unit 70 can comprise a rotary actuator 40 according to the first embodiment.

The fourth embodiment substantially corresponds to the third embodiment, but in particular differs therefrom insofar as a functional module assembly 7 is located between the end face 3 of the tubular body 44 and the housing cover 4. In addition, the housing cover 4 has no recess in this case and is secured to the functional module assembly 7 by means of the mounting screws 9.

The receptacle chamber 38 is here open towards the functional module assembly 7, and the position feedback device 36 extends into the functional module assembly 7. For this purpose, a receptacle chamber is preferably provided in an upper wall section of the functional module assembly 7.

The functional module assembly 7 lengthens the installation space of the rotary actuator 50 in the axial direction. The valve fitting 40, on which the rotary actuator 50 is placed, has two pipe connectors 31A and 31B, which are arranged coaxially along a pipework direction 32. The pipework direction 32 runs parallel to the axial direction 26. This results in a process valve unit of a particularly compact design.

In operation, the process valve unit 70 is supplied with compressed air from a line connected to an external pressure port of the rotary actuator 50. The compressed air is looped through a control valve assembly, which is provided in the functional module assembly 7, for example, and which is in particular designed as a 5/3-way valve. The outlets of the control valve assembly are connected to chambers of the piston space 11 via suitable working passages. In accordance with a control command, the outlets of the control valve assembly are switched to a pressure or venting state in order to hold the drive pistons of the drive piston assembly 19 in their current position or in a defined position or to move them towards or away from one another. The control command is, for example, output to the control valve assembly by an electronics assembly which is preferably located in the functional module assembly 7. As an alternative, the control command can be output by the position feedback device 36. The movement of the drive pistons of the drive piston assembly 19 turns the output shaft 6, whereby the spindle of the valve fitting 24 and finally the valve member of the valve fitting 24 are turned or actuated.

The position indicator 23, which is non-rotatably connected to the output shaft 6, receives the rotary movement of the output shaft 6, so that the position of the magnet assembly 34 relative to the position feedback device 36 is changed. The magnetic field detected by the position feedback device changes accordingly. On the basis of the detected magnetic field, the position feedback device 36 provides a position signal corresponding to the position of the output shaft 6 and/or of the valve member.

The invention claimed is:

1. A fluid-actuated rotary actuator comprising a housing having a tubular body extending in an axial direction, in which is provided a drive piston assembly for driving a rotatably mounted output shaft, which extends perpendicular to the axial direction through the tubular body and the axial end of which is routed out of the tubular body at an upper wall section of the tubular body, further comprising a magnet assembly associated with the axial end of the output shaft and receiving a rotary movement of the output shaft, and further comprising a position feedback device configured to detect the magnetic field generated by the magnet assembly and to provide, in accordance with the detected magnetic field, a position signal corresponding to a position of the output shaft, wherein the position feedback device is located in a receptacle chamber formed in the upper wall section of the tubular body, the receptacle chamber having a first section open at the upper wall section and a second section extending from the first section, the first section corresponding to a head section of the position feedback device and the second section corresponding to a shaft section of the position feedback device.

2. The fluid-actuated rotary actuator according to claim 1, wherein the receptacle chamber is open towards an end face and/or a longitudinal side of the tubular body.

3. The fluid-actuated rotary actuator according to claim 1, wherein the receptacle chamber is open towards an end face of the tubular body, and wherein a housing cover is placed on the end face, the housing cover having a recess through which a connector and/or a cable is/are routed to the position feedback device.

4. The fluid-actuated rotary actuator according to claim 1, wherein a housing cover, which covers the receptacle chamber towards the end face and holds the position feedback device in the receptacle chamber, is placed on the end face.

5. The fluid-actuated rotary actuator according to claim 1, wherein the position feedback device comprises an oblong shaft section, which comprises a magnetic field sensor element, and a head section, the cross-section of the head section being wider and/or higher than the cross-section of the shaft section.

6. The fluid-actuated rotary actuator according to claim 1, further comprising a position indicator, which is placed on the axial end of the output shaft and in which the magnet assembly is located.

7. The fluid-actuated rotary actuator according to claim 6, wherein the position indicator has an indicating element for the visual indication of a position of the output shaft.

8. The fluid-actuated rotary actuator according to claim 1 further comprising a position indicator, which is fitted to the axial end of the output shaft and in which the magnet assembly is located, wherein the position indicator is removably mounted on the output shaft and the rotary actuator is configured to adopt a predetermined operating state, if the position feedback device detects a removal and/or replacement of the position indicator.

9. The fluid-actuated rotary actuator according to claim 1, wherein the magnet assembly comprises a permanent magnet which is designed to be an annular segment.

10. The fluid-actuated rotary actuator according to claim 1, wherein the magnet assembly comprises one or more magnet bars.

11. The fluid-actuated rotary actuator according to claim 1, wherein the position feedback device comprises a Hall sensor.

12. The fluid-actuated rotary actuator according to claim 1, wherein the receptacle chamber is open towards an end face at an axial end of the tubular body, and wherein a functional module assembly is placed on the end face, and wherein a receptacle chamber into which the position feedback device projects is formed in the functional module assembly.

13. A process valve unit, comprising a fluid-actuated rotary actuator according to claim 1 and a valve fitting with a spindle and a valve member, wherein the fluid-actuated rotary actuator is mounted on the valve fitting and the valve member is mechanically coupled to the output shaft of the fluid-actuated rotary actuator via the spindle, so that the position of the valve member is determined by the position of the output shaft.

14. A fluid-actuated rotary actuator comprising a housing having a tubular body extending in an axial direction, in which is provided a drive piston assembly for driving a rotatably mounted output shaft, which extends perpendicular to the axial direction through the tubular body and the axial end of which is routed out of the tubular body at an upper wall section of the tubular body, further comprising a magnet assembly associated with the axial end of the output shaft and receiving a rotary movement of the output shaft, and further comprising a position feedback device configured to detect the magnetic field generated by the magnet assembly and to provide, in accordance with the detected magnetic field, a position signal corresponding to a position of the output shaft, wherein the position feedback device is located in a receptacle chamber formed in the upper wall section of the tubular body, and
　　wherein the position feedback device comprises an oblong shaft section, which comprises a magnetic field sensor element, and a head section, the cross-section of the head section being wider and/or higher than the cross-section of the shaft section, and
　　wherein the receptacle chamber has a first section, which is open towards the end face of the tubular body and accommodates the head section, and a second section, which opens out at a rear wall of the first section and accommodates the shaft section.

15. The fluid-actuated rotary actuator according to claim 14, wherein the cross-section of the head section is wider and/or higher than the cross-section of the second section, so that the head section abuts the rear wall of the first section.

* * * * *